US008643666B2

(12) United States Patent
Miller et al.

(10) Patent No.: US 8,643,666 B2
(45) Date of Patent: Feb. 4, 2014

(54) STENCILED LAYER PEELING GRAPHICS PROCESSING

(75) Inventors: Gavin S. P. Miller, Los Altos, CA (US); Byungmoon Kim, Sunnyvale, CA (US); Grayson Squier Lang, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 163 days.

(21) Appl. No.: 13/035,530

(22) Filed: Feb. 25, 2011

(65) Prior Publication Data

US 2013/0127855 A1 May 23, 2013

(51) Int. Cl.
*G09G 5/02* (2006.01)

(52) U.S. Cl.
USPC .......................................................... 345/592

(58) Field of Classification Search
USPC .......................................... 345/422, 592, 611
See application file for complete search history.

(56) References Cited

U.S. PATENT DOCUMENTS

| 5,854,631 | A | * | 12/1998 | Akeley et al. ............ 345/419 |
| 7,030,887 | B2 | | 4/2006 | Andrews |
| 7,688,319 | B2 | | 3/2010 | Miller |
| 2007/0002044 | A1 | * | 1/2007 | Lake et al. .................. 345/422 |
| 2011/0267363 | A1 | * | 11/2011 | Miller et al. ................ 345/592 |

FOREIGN PATENT DOCUMENTS

CN   101308581 A  * 11/2008 .............. G06T 15/40

OTHER PUBLICATIONS

Myers, K. and Bavoil, L., Stencil Routed A-Buffer, SIGGRAPH '07:ACM SIGGRAPH 2007 sketches; ACM 2007.*

U.S. Appl. No. 11/749,868, filed May 17, 2007 Entitled: "Multiplied Occluding Transparency Graphics Processing" by Miller, et al; 38 pages.
U.S. Appl. No. 12/177,709, filed Jul. 22, 2008 Entitled: "System and Methods Fo Rendering Transparent Surfaces in High Depth Complexity Scenes Using Hybrid and Coherent Layer Peeling" by Carr, et al; 64 pages.
Everitt, C.: Interactive Order-Independent Transparency. NVIDIA Corporation, May 2001. 11 pages. http://developer.nvidia.com/content/interactive-order-independent-transparency.
Liu, B., Wei, L.-Y., and Xu, Y.-Q.: Multi-Layer Depth Peeling via Fragment Sort. Microsoft Corporation, Jun. 2006. 4 pages. http://research.microsoft.com/research/pubs/view.aspx?tr_id=1125.
Mammen, A.: Transparency and antialiasing algorithms implemented with the virtual pixel maps technique. IEEE Comput. Graph. Appl. 9, 4 (1989), pp. 43-55, Jul. 1989.
Myers, K., Bavoil, L.: Stencil routed k-buffer. NVIDIA Corporation, Nov. 2007. 5 pages. http://developer.download.nvidia.com/SDK/10/direct3d/Source/StencilRoutedKBuffer/doc/StencilRoutedKBuffer.pdf.
Bavoil, L., Callahan, S. P., Lefohn, A., Jo A. L. D. C., and Silva, C. T. 2007. Multi-fragment effects on the GPU using the k-buffer. In I3D '07: Proceedings of the 2007 symposium on Interactive 3D graphics and games, ACM, New York, NY, USA, pp. 97-104, Apr. 2007.
Wexler, D., Gritz, L., Enderton, E., and Rice, J.: GPU-accelerated high-quality hidden surface removal. In Graphics Hardware 2005, pp. 7-14, Jul. 2005.

* cited by examiner

*Primary Examiner* — Carlos Perromat
(74) *Attorney, Agent, or Firm* — Wolfe-SBMC

(57) ABSTRACT

A method, system, and computer-readable storage medium are disclosed for rendering an artwork comprising a plurality of surfaces, wherein the plurality of surfaces comprises a plurality of semi-transparent surfaces unsorted in depth. An identifier of the nearest semi-transparent surface may be determined and stored in a stencil count of a stencil buffer. The depth of the second nearest semi-transparent surface may be determined using a stencil test based on the stencil count to bypass the nearest semi-transparent surface. The second nearest semi-transparent surface may be rendered to an image buffer, and the nearest semi-transparent surface may be rendered to the image buffer.

20 Claims, 9 Drawing Sheets

STENCILED LAYER PEELING GRAPHICS PROCESSING

BACKGROUND

1. Field of the Invention

The present invention is directed to computer systems; and more particularly, it is directed to rendering artwork including semi-transparent surfaces using computer systems.

2. Description of the Related Art

As the power and complexity of personal computer systems increase, graphics operations and graphical data are likewise increasing in complexity. For example, an instance of three-dimensional (3-D) artwork may include numerous layers of graphical data. The layers may be related in complex ways based on their relative depth as well as their transparency properties. The layers may also be referred to as surfaces. It is desirable to render artwork containing such layers (e.g., for display on a display device) both correctly and efficiently.

A typical problem encountered when rendering 3-D artwork is hidden surface removal, which involves finding the nearest surface at each pixel. Because the image is created using only the color of the nearest shaded surface at each pixel, hidden surface removal produces a realistic depiction of opaque objects.

One technique for rendering hidden surfaces involves sorting the triangles which make up the surface so that the nearest triangles are rendered last when rasterizing the triangles. This geometry sorting technique may be referred to as an object-space sort. However, this technique may be inefficient for complex models containing intersecting surfaces, e.g., where the triangles that make up a surface are broken up into smaller pieces.

Another technique for hidden surface removal stores the depth value (Z-value) at each pixel sample. This technique may be referred to as an image-space sort. The Z-value is initialized to a suitably far value, and the surfaces are then rasterized to compute the surface Z-value at each pixel. If the surface Z-value is smaller than the Z-value for the pixel sample, then the pixel color and pixel Z-value are replaced with the surface color and surface Z-value.

A Z-buffer technique is a method for rendering opaque surfaces in modern graphics hardware. The Z-buffer or depth buffer is part of an off-screen memory that stores the depth of each pixel or the distance (i.e., the Z-value) of each pixel from the viewpoint. When using the Z-buffer technique to render images, however, aliasing artifacts may result on edges of the geometry. Modern graphics hardware may address the aliasing problem in several ways. One technique involves rendering the image to an off-screen buffer that is larger than the final displayed image and then filtering down the result. Another technique involves rendering the image several times, slightly "jittering" the camera each time, and averaging the resulting images to reduce the aliasing artifacts. A solution referred to as full-screen anti-aliasing may use multiple color and Z-samples (i.e., sub-pixels) for each pixel.

A modern graphics processing unit (GPU) typically runs small programs called pixel shaders to compute the surface color and the alpha values for each pixel based on texture values. Pixel shaders may be relatively expensive to execute. One optimization used in full-screen anti-aliasing is to compute the pixel shader once per pixel then use the resulting color and the alpha value for each of the sub-pixels when performing Z-buffering. The Z-value may then be interpolated correctly for each sub-pixel from the geometry to allow for anti-aliased intersections to be rendered correctly.

A blending function referred to as "over" may be used in representing surfaces in 3-D scenes. A vertex or pixel in a surface may be described by an opaque color along with at least one transparency value. The surface transparency value may directly scale the amount of light coming through the surface, and one minus the transparency value may scale the opaque color before adding the result to the pixel. To simplify subsequent calculations, the surface color may be defined as the pre-multiplied surface color (i.e., the surface opaque color value) multiplied by one minus the surface transparency value. The formula for the over operator may be represented by the following equation (1), where the colors are for the pixel before and after compositing of the Nth surface:

$$C_{pixel}^{N} = C_{surface}^{N} + T_{surface}^{N} * C_{pixel}^{N-1} \tag{1}$$

One technique to compute the final color arising from a stack of transparent surfaces is to sort them in order of depth value (Z-value) and then apply equation (1) from back to front. When the scene also includes opaque surfaces, the nearest opaque surface is first used to set the color of the pixel. Any transparent surfaces behind the nearest opaque surface are discarded since they are obscured by the opaque surface. This technique is referred to as back-to-front compositing.

Another technique is to operate on the surfaces in front to back order. In addition to the pixel color, a transparency value is kept at each pixel sample. This pixel transparency is initially set to one. For subsequent surfaces, the values of the pixel sample transparency and pixel sample color are modified using equations (2) and (3):

$$C_{pixel}^{N} = T_{pixel}^{N-1} C_{surface}^{N} + C_{pixel}^{N-1} \tag{2}$$

$$T_{pixel}^{N} = T_{pixel}^{N-1} T_{surface}^{N} \tag{3}$$

To avoid sorting the surfaces before rendering, an image-space method referred to as layer peeling may be used during rasterization. Layer peeling may render the geometry from front to back using two Z-buffers to compute the nearest surface, the next nearest surface, and so on. A drawback of the layer peeling technique is the need for a second Z-buffer: for example, a first Z-buffer (i.e., an opaque-z-buffer or visibility-z-buffer) may be used to store the depth of the nearest opaque surface, and a second Z-buffer (i.e., a cull-z-buffer) may be used for rendering transparent geometry for each iteration, with the nearest opaque surface color being blended in the end. On modern graphics hardware, a depth texture can be used to store the depth value (Z-value) of the Z-buffer. Originally designed for Z-buffered shadows, the depth texture test allows one sample per pixel and returns the result of testing a depth value against the contents of a pixel. Other extensions of conventional layer peeling techniques include coherent layer peeling (for rendering sequences of fragments that are in occlusion order in a single iteration) and dual layer peeling (for peeling two layers per iteration of the algorithm).

Conventional approaches towards layer peeling, however, are currently incompatible with full-screen anti-aliasing. If full-screen anti-aliasing is not disabled when conventional layer peeling is employed, errors in rendering may result from inexact matches between the cull-z-buffer and the visibility-z-buffer. For similar reasons, extensions such as coherent layer peeling and dual layer peeling may also be incompatible with full-screen anti-aliasing.

SUMMARY

Various embodiments of systems, methods, and computer-readable storage media for rendering artwork including semi-transparent surfaces are disclosed. A three-dimensional computer graphics artwork may comprise a plurality of surfaces including a plurality of semi-transparent surfaces and optionally one or more opaque surfaces. The semi-transparent surfaces may be unsorted relative to their depth order prior to rendering. According to one embodiment, an identifier of the nearest semi-transparent surface may be determined and stored in a stencil count of a stencil buffer. The identifier may comprise the number of surfaces encountered after the nearest semi-transparent surface in the draw order or the number of surfaces encountered before the nearest semi-transparent surface in the draw order.

The depth of the second nearest semi-transparent surface may be determined using a stencil test based on the stencil count to bypass the nearest semi-transparent surface. The second nearest semi-transparent surface may be rendered to an image buffer. According to one embodiment, a z-equals test based on the determined depth of the second nearest semi-transparent surface may be used in rendering the second nearest semi-transparent surface. The nearest semi-transparent surface may then be rendered to the image buffer. According to one embodiment, a z-less test based on the determined depth of the second nearest semi-transparent surface may be used in rendering the nearest semi-transparent surface.

A nearest opaque surface in the artwork may be rendered prior to rendering the semi-transparent surfaces. According to one embodiment, the surfaces may be rendered using full-screen anti-aliasing by rendering the surfaces to a multi-sampling buffer at a multi-sampled resolution and then reducing the rendered surfaces from the multi-sampled resolution to a display resolution.

Figure 1:
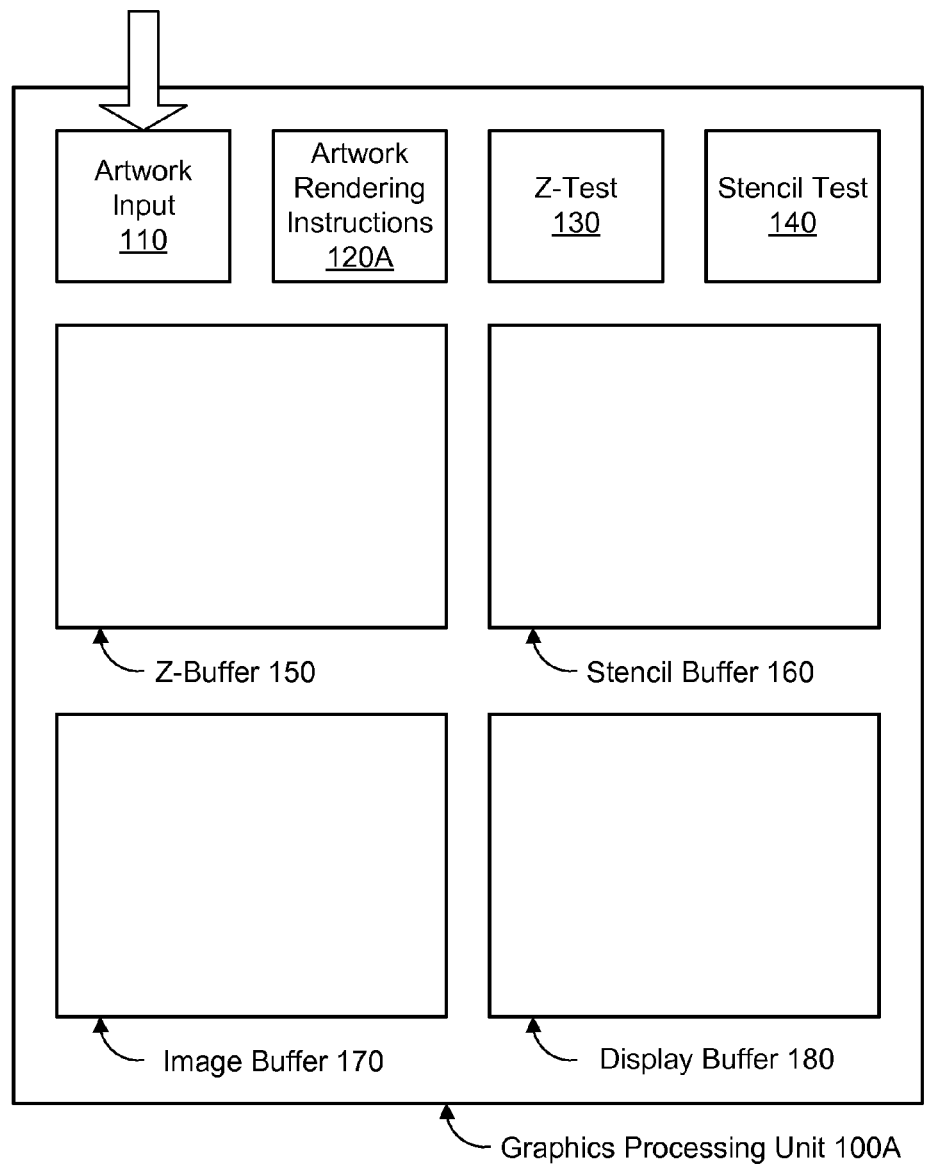
FIG. 1 is a block diagram illustrating one embodiment of a graphics processing unit (GPU) configured for rendering artwork including semi-transparent surfaces using an image buffer at display resolution.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Using embodiments of the systems and methods described herein, an instance of computer graphics artwork (referred to herein as "an artwork") comprising a plurality of semi-transparent surfaces may be partially rendered in an efficient manner using Stenciled Layer Peeling techniques. Stenciled Layer Peeling may be used to render the two nearest semi-transparent surfaces along with the nearest opaque surface. In one embodiment, full-screen anti-aliasing (e.g., using multi-sampling hardware) may be used during the rendering of surfaces with Stenciled Layer Peeling.

In the following detailed description, numerous specific details are set forth to provide a thorough understanding of claimed subject matter. However, it will be understood by a person of ordinary skill in the art in light of this specification that claimed subject matter may be practiced without necessarily being limited to these specific details. In some instances, methods, apparatuses or systems that would be known by a person of ordinary skill in the art have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 8:
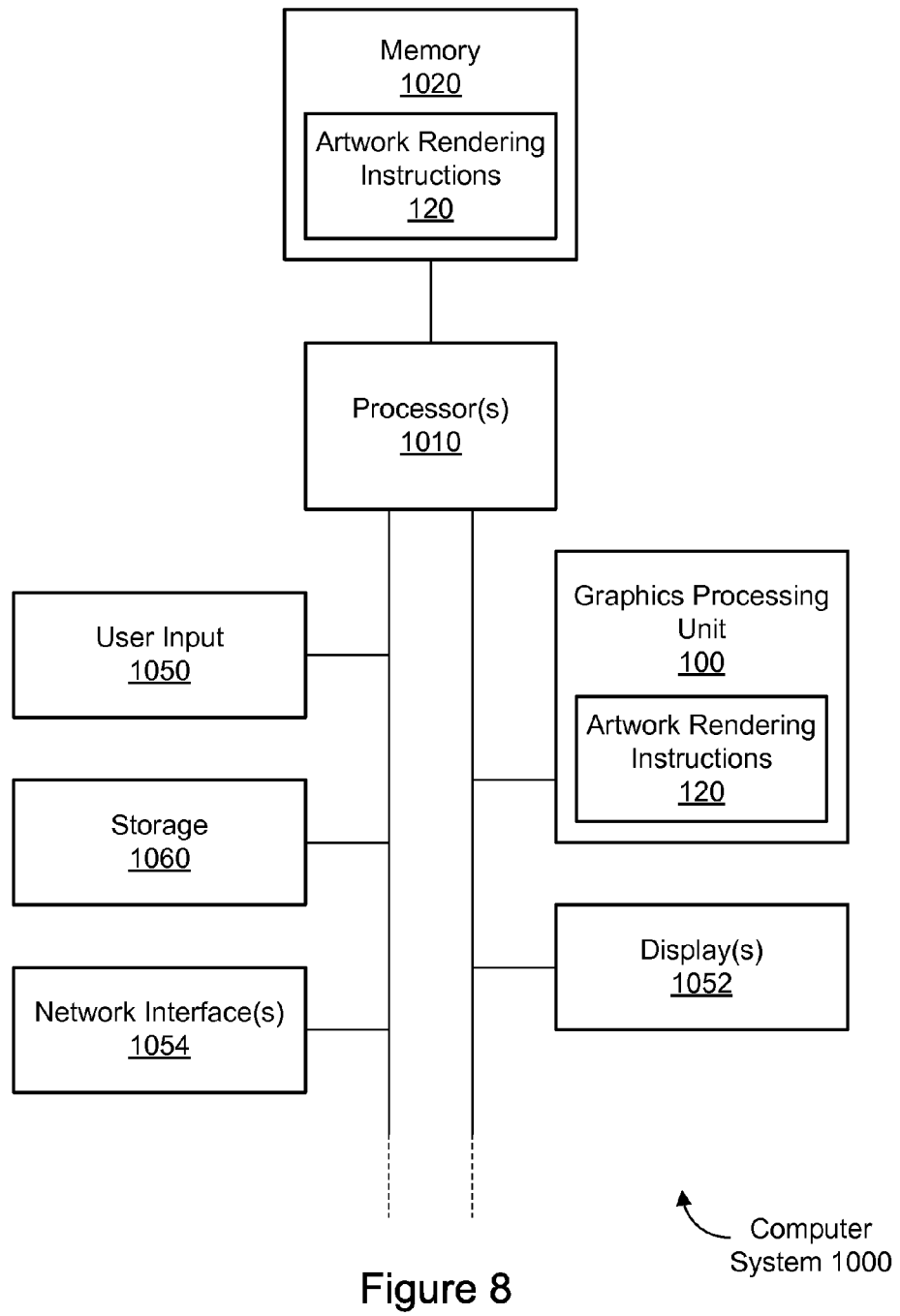
FIG. 8 is a block diagram illustrating constituent elements of a computer system that is configured to implement embodiments of the system and method for rendering artwork including semi-transparent surfaces.

In one embodiment, a graphics processing unit (GPU) may be used to perform aspects of artwork rendering operations. FIG. 1 is a block diagram illustrating one embodiment of a GPU 100A configured for rendering artwork including semi-transparent surfaces using an image buffer at display resolution. A GPU, also referred to herein as a graphics processor, may comprise a dedicated graphics rendering device associated with a computer system. An example of a suitable computer system 1000 for use with a GPU is illustrated in FIG. 8. Turning back to FIG. 1, the GPU 100A may include numerous specialized components configured to optimize the speed of rendering graphical data to produce graphics output. For example, the GPU 100A may include specialized components for rendering three-dimensional structures, for applying textures to surfaces, etc. For the sake of illustration, however, only a limited selection of components is shown in the example GPU 100A of FIG. 1. It is contemplated that GPU architectures other than the example architecture of FIG. 1 may be suitable for implementing the techniques described herein. Suitable GPUs may be commercially available from vendors such as NVIDIA Corporation, ATI Technologies, and others.

A GPU may be used in a removable graphics card that is coupled to a motherboard via a standardized bus (e.g., AGP or PCI Express). A GPU may also be used in an integrated graphics solution (e.g., for use in some portable computers and lower-cost desktop computers). The GPU may include a host interface configured to communicate with elements of a host computer system 1000 (e.g., a communications bus and/or processor(s) 1010 of a host computer system 1000). For example, the host computer system 1000 may provide input data (e.g., artwork input 110) and/or executable program code (e.g., artwork rendering instructions 120A) to the GPU 100. In some embodiments, the host interface may permit the movement of data in both directions between the GPU 100 and the host computer system 1000. In one embodiment, the GPU 100 may be configured to access memory 1020 of the host computer system 1000 via the host interface. The GPU 100 may also include a display interface configured to provide output data to one or more display devices 1052. The GPU 100 may "drive" a display 1052 by providing graphics output at a particular rate from a frame buffer. The GPU 100 may implement one or more application programmer interfaces (APIs) that permit programmers to invoke the functionality of the GPU.

In one embodiment, the GPU 100 may include internal memory. The GPU memory, also referred to herein as "video memory" or "VRAM," may comprise random-access memory (RAM) which is accessible to other GPU components. As will be described in greater detail below, the GPU memory may be used in various embodiments to store various types of data and instructions such as input data, output data, intermediate data, program instructions for performing various tasks, etc. As illustrated in FIG. 1, he GPU memory may comprise one or more buffers such as a Z-buffer (i.e., depth buffer) 150, a stencil buffer 160, and various image buffers such as a display buffer 180 and/or any other image buffer 170. Each buffer may comprise a two-dimensional array of pixel data (e.g., color values) or pixel metadata (e.g., depth values). The use of the individual buffers in the rendering of artwork including a plurality of semi-transparent surfaces is described in greater detail below.

The GPU 100A may also include various built-in functions to assist in the rendering of artwork. In one embodiment, the GPU 100A may include a Z-test (i.e., depth test) function 130 operable to perform comparisons of Z-values (i.e., depth values in the Z-buffer 150) and take action accordingly (e.g., keep or discard pixels). In one embodiment, the GPU 100A may include a stencil test function 140 operable to perform comparisons of stencil values (e.g., in the stencil buffer 160) and take action accordingly (e.g., keep or discard pixels). The Z-test 130 and stencil test 140 may be enabled, disabled, and/or otherwise configured through invocation of appropriate functions in the GPU API and/or by operation of the artwork rendering instructions 120A. As will be described in greater detail below, the Z-test 130 and/or stencil test 140 may be used in the rendering of artwork including a plurality of semi-transparent surfaces.

Figure 2A:
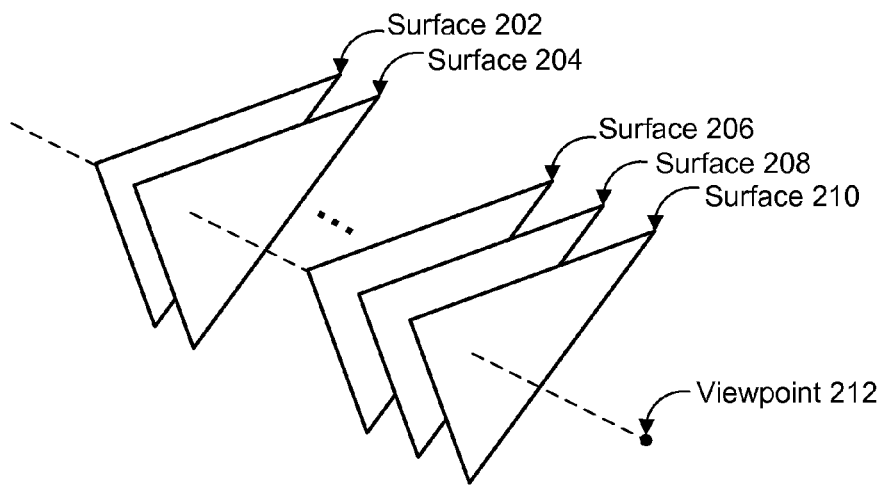
FIG. 2A is a diagram illustrating a depth order of semi-transparent surfaces in an artwork that is configured to be rendered using embodiments of the systems and methods described herein.

FIG. 2A is a diagram illustrating a depth order of semi-transparent surfaces in an artwork that is configured to be rendered using embodiments of the systems and methods described herein. In contrast to opaque surfaces that completely obscure surfaces behind them, each of the semi-transparent surfaces 202, 204, 206, 208, and 210 may partially block the color of individual pixels in surfaces further away from a viewpoint 212. As used herein, "semi-transparent" and "transparent" are used synonymously. The shapes and positions of the semi-transparent surfaces 202, 204, 206, 208, and 210 may vary from the example shown in FIG. 2A. The example semi-transparent surfaces 202, 204, 206, 208, and 210 are illustrated in a depth order reflecting their relative distance from the viewpoint 212. In the example shown in FIG. 2A, surface 202 is the furthest surface, and surface 210 is the nearest surface. When determining the color for a given pixel in the frame, the contribution to the final color value by a given semi-transparent surface is a function of the color value for the given surface attenuated by the transparency of each surface in front of the given surface.

In one embodiment, the surfaces may be stored as geometric objects using a 3-D graphics model, and the geometric objects may be rasterized to pixels during a rendering process. In one embodiment, the transparency properties of a surface may be indicated by one or more alpha values for vertices or pixels in the surface. The alpha value(s) may be stored in one or more alpha channels along with one or more color channels (e.g., representing red, green, and blue values) for each vertex or pixel. In one embodiment, the semi-transparent surfaces may be implemented using a general transparency model in which the foreground and the background alpha and color values are combined using a blending function (also referred to as a compositing operator). As used herein, the terms "surfaces" and "layers" are used synonymously.

Figure 2B:
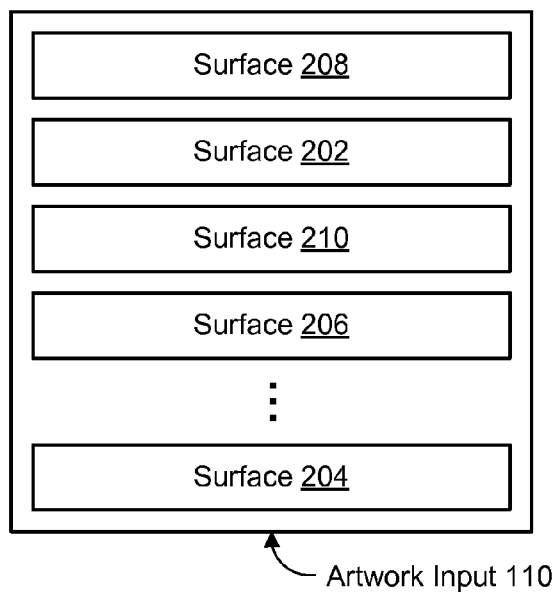
FIG. 2B is a diagram illustrating a draw order of semi-transparent surfaces in an artwork that is configured to be rendered using embodiments of the systems and methods described herein.

FIG. 2B is a diagram illustrating a draw order of semi-transparent surfaces in an artwork that is configured to be rendered using embodiments of the systems and methods described herein. In one embodiment, the GPU 100A may be configured to render surfaces in draw order, i.e., the order in which the surfaces are received at the GPU 100A. When provided as artwork input 110 to a GPU, the semi-transparent surfaces 202, 204, 206, 208, and 210 may be provided in an order that is not the same as the depth order illustrated in FIG. 2A. An example draw order is illustrated in FIG. 2B. By rendering artwork comprising a plurality of semi-transparent surfaces in substantially any draw order, the systems and methods described herein may be order-independent.

Vertices or pixels in the semi-transparent surfaces 202, 204, 206, 208, and 210 may have associated Z-values (i.e., depth values) indicating relative depth or distance from the viewpoint 212. In one embodiment, the Z-values referred to as "Z-far" and "Z-near" may be used to ensure that the depth values stored in the Z-buffer 150 are of a known finite range. In one embodiment, a more accurate Z-test 130 may be performed for a given precision of Z-buffer values when Z-far and Z-near values tightly bracket the actual geometry.

Front-to-back methods such as layer peeling may yield acceptable results for a finite number of passes, since the nearer surfaces often make the most important perceptual contribution to the scene. As discussed herein, a technique referred to as Stenciled Layer Peeling may incorporate the early termination characteristics of layer peeling while also being compatible with full-screen anti-aliasing. In one embodiment, Stenciled Layer Peeling is a form of layer peeling in which the stencil buffer 160 is used instead of the cull-z-buffer as used in conventional layer peeling techniques. In one embodiment, Stenciled Layer Peeling may be used to render the two nearest semi-transparent surfaces along with the nearest opaque surface; other surfaces may be discarded. The term "surface" as used herein with respect to Stenciled Layer Peeling techniques may refer to one or more fragments or objects at the same depth layer. Stenciled Layer Peeling may be employed in environments such as real-time graphics where rendering of only the nearest layers is sufficient.

Figure 3:
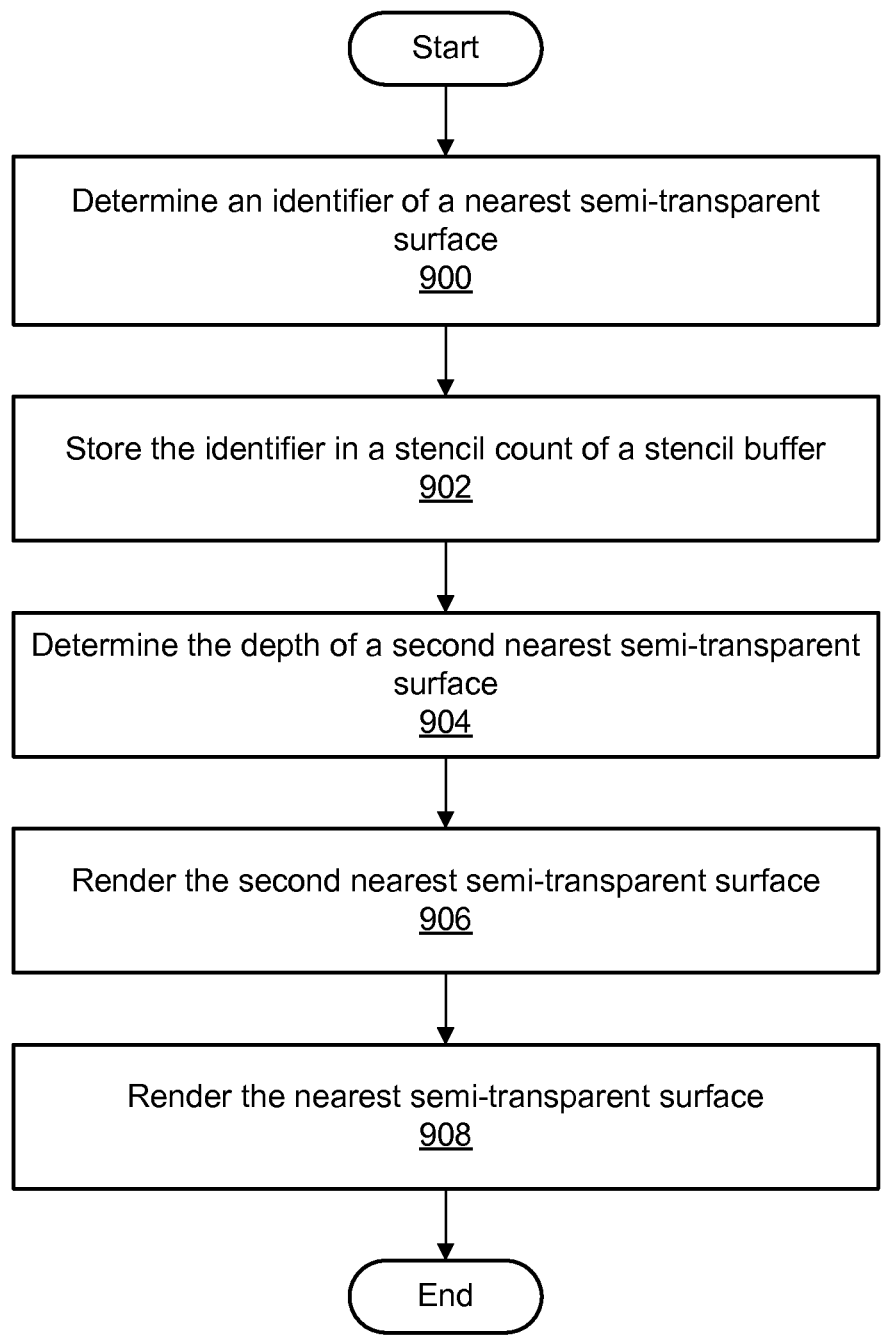
FIG. 3 is a flow diagram illustrating a method for rendering artwork including semi-transparent surfaces using Stenciled Layer Peeling according to one embodiment.

FIG. 3 is a flow diagram illustrating a method for rendering artwork including semi-transparent surfaces using Stenciled Layer Peeling according to one embodiment. In one embodiment, the semi-transparent surfaces may be unsorted in depth and processed in draw order.

As shown in block 900, an identifier of a nearest semi-transparent surface of the plurality of semi-transparent surfaces may be determined. For example, the identifier may comprise a number of semi-transparent surfaces encountered after encountering the nearest semi-transparent surface in a draw order of the semi-transparent surfaces. Alternatively, the identifier may comprise a number of semi-transparent surfaces encountered after encountering the nearest semi-transparent surface in a draw order of the semi-transparent surfaces. As shown in block 902, the identifier may be stored in a stencil count of the stencil buffer.

As shown in block 904, the depth of a second nearest semi-transparent surface of the plurality of semi-transparent surfaces may be determined. In one embodiment, determining the depth of the second nearest transparent surface may comprise using a stencil test based on the stored stencil count to bypass the nearest semi-transparent surface.

As shown in block 906, the second nearest semi-transparent surface may be rendered to an image buffer. Rendering the second nearest semi-transparent surface to the image buffer may comprise using a z-equals test based on the determined depth of the second nearest semi-transparent surface. As shown in block 908, the nearest semi-transparent surface may be rendered to the image buffer. Rendering the nearest semi-transparent surface to the image buffer may comprise using a z-less test based on the determined depth of the second nearest semi-transparent surface. In one embodiment, the nearest opaque surface of the plurality of surfaces may be rendered to the image buffer before rendering the second nearest semi-transparent surface and the nearest semi-transparent surface to the image buffer.

In one embodiment, the image buffer comprises a multi-sampled image buffer, and the second nearest semi-transparent surface and nearest semi-transparent surface may be rendered to the multi-sampled image buffer at a multi-sampled resolution. The rendered second nearest semi-transparent surface and the rendered nearest semi-transparent surface may then be reduced from the multi-sampled resolution to a display resolution. In this manner, full-screen anti-aliasing may be used along with Stenciled Layer Peeling.

Figure 4:
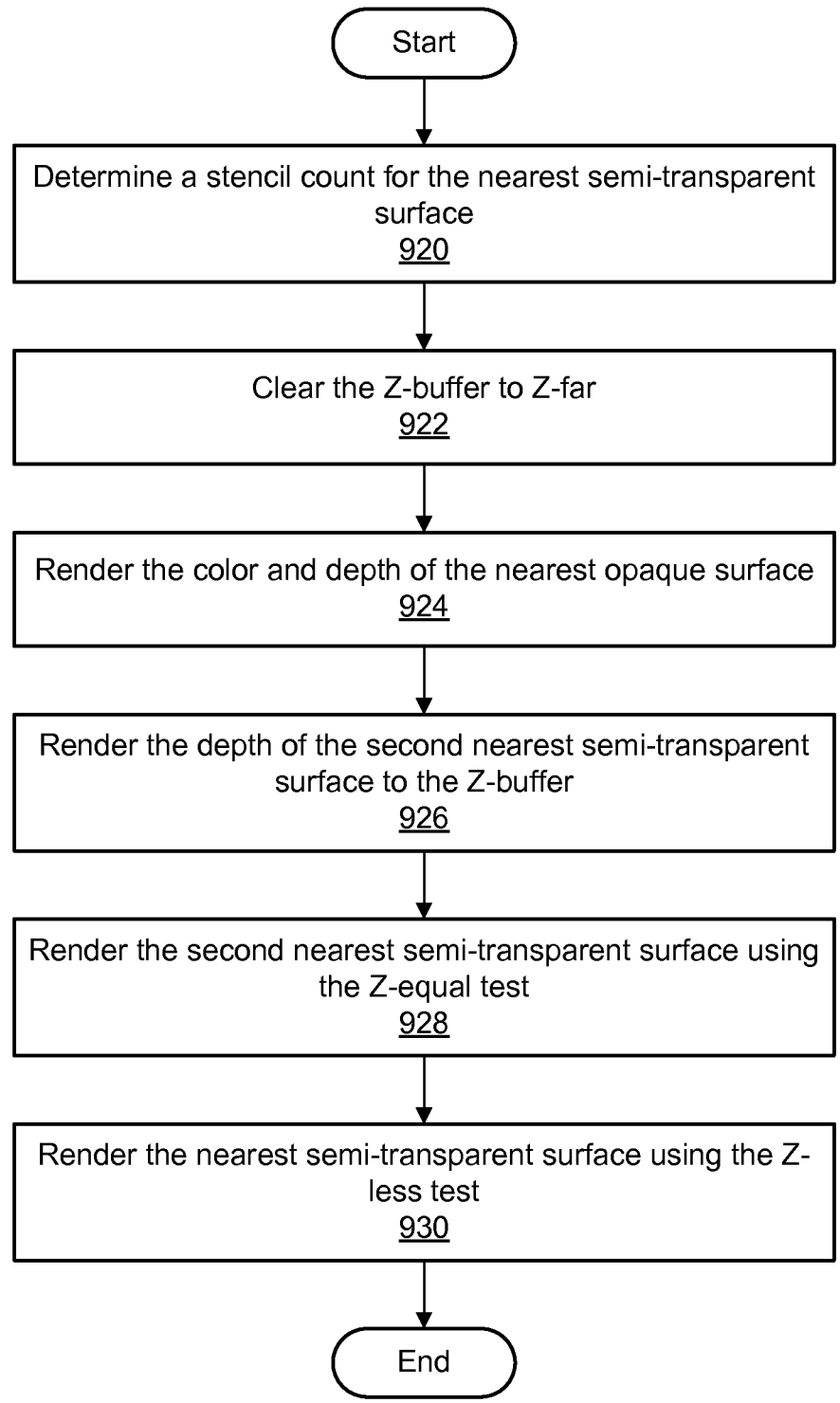
FIG. 4 is a flow diagram illustrating further aspects of a method for rendering artwork including semi-transparent surfaces using Stenciled Layer Peeling according to one embodiment.

FIG. 4 is a flow diagram illustrating further aspects of a method for rendering artwork including semi-transparent surfaces using Stenciled Layer Peeling according to one embodiment. In one embodiment, the semi-transparent surfaces may be unsorted in depth and processed in draw order.

As shown in block 920, an identifier of the nearest semi-transparent surface may be determined. The identifier may comprise a fragment count or stencil count. In one embodiment, it may not be feasible to directly compute the fragment count for the nearest surface, i.e., how many fragments have been rendered before that fragment. In various embodiments, however, the number of fragments rendered after the nearest surface may be computed as discussed below with reference to FIG. 5A.

As shown in block 922, the Z-buffer may be cleared to Z-far. As shown in block 924, the color and depth of the opaque geometry may be rendered to the color buffer and the Z-buffer. In one embodiment, the color and depth of the opaque geometry may be rendered to the color buffer and the Z-buffer using Z-less with Z-write enabled. In one embodiment, the stencil buffer may be unmodified for all stencil cases by using a parameter such as "keep."

As shown in block 926, the depth of the second nearest semi-transparent surface may be rendered to the Z-buffer using the Z-less test. In one embodiment, the stencil may be used to skip rasterization of the nearest surface in the operation shown in block 926. Further aspects of block 926 are discussed below with reference to FIG. 7.

As shown in block 928, the second nearest semi-transparent surface may be rendered into the color buffer using the Z-equal test with Z-write disabled. In one embodiment, the "over" compositing blend mode may be used in the operation shown in block 928. In another embodiment, any other suitable back-to-front blend mode may be used in the operation shown in block 928.

As shown in block 930, the nearest semi-transparent surface may be rendered into the color buffer using the Z-less test with Z-write disabled. In one embodiment, the "over" compositing blend mode may be used in the operation shown in block 930. In another embodiment, any other suitable back-to-front blend mode may be used in the operation shown in block 930.

In one embodiment, the semi-transparent surfaces and/or opaque surfaces may be rendered using full-screen anti-aliasing in conjunction with the Stenciled Layer Peeling techniques illustrated in FIGS. 3 and 4. For example, surfaces may be rendered to a first image buffer (e.g., image buffer 180) at a multi-sampled resolution. A full-screen anti-aliasing mechanism of the GPU may be used to implement the multi-sampled image buffer 180 at a higher resolution than the final display resolution. The multi-sampled image buffer 180 may be allocated to have a greater resolution (e.g., twice the horizontal resolution and twice the vertical resolution) as the display resolution. The multi-sampled image buffer 180 may comprise a fixed multiple (e.g., four, eight, sixteen, etc.) of pixel values (e.g., color values and alpha values) for each destination pixel in the artwork. The multiples may be referred to as multi-samples or sub-pixels. Rendering the surface may comprise rasterizing one or more objects and/or executing a pixel shader and/or vertex shader to generate the multi-samples.

Figure 5A:
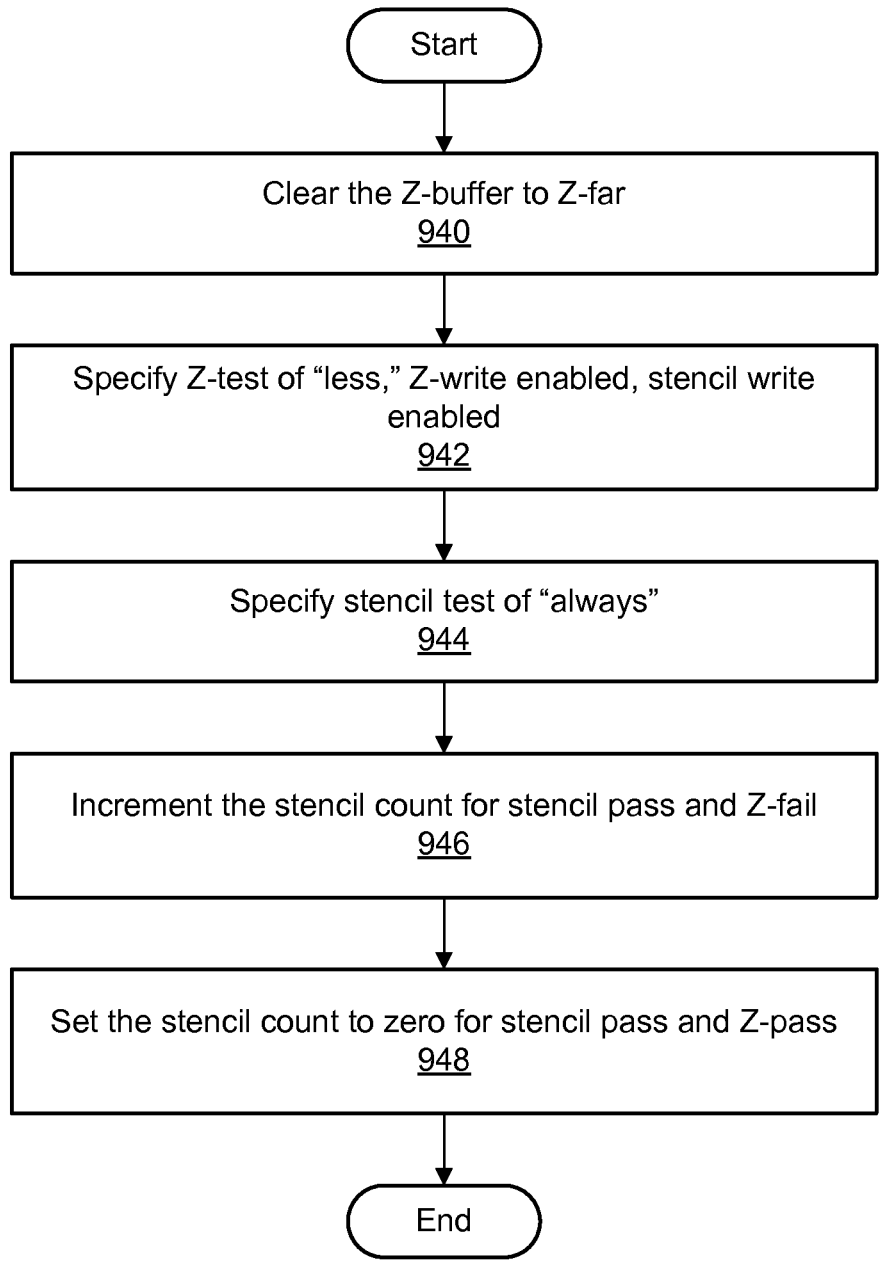
FIG. 5A is a flow diagram illustrating a method for counting the number of surfaces rendered after the nearest surface in Stenciled Layer Peeling and storing the result as a positive number in the stencil according to one embodiment.
Figure 5B:
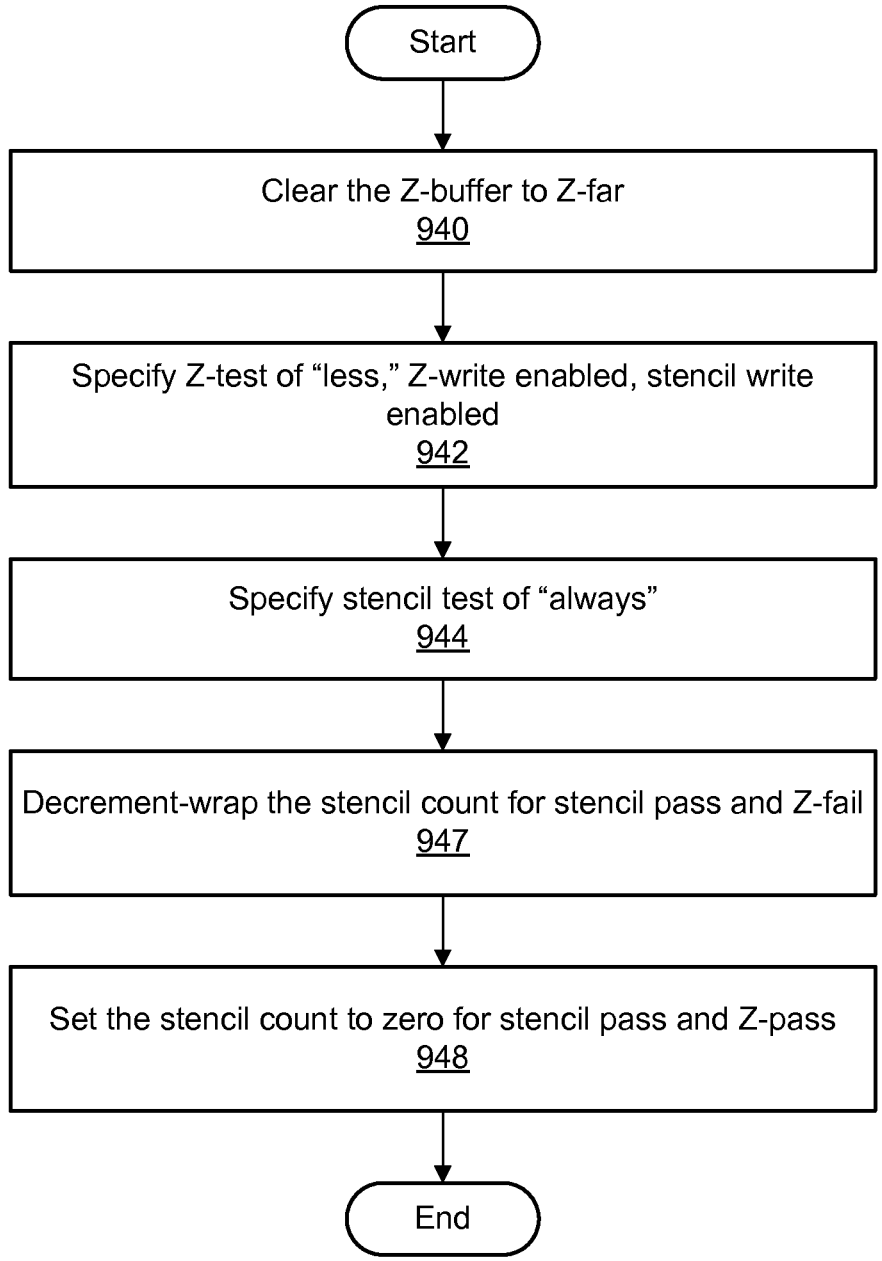
FIG. 5B is a flow diagram illustrating a method for counting the number of surfaces rendered after the nearest surface in Stenciled Layer Peeling and storing the result as a negative number in the stencil according to one embodiment.
Figure 6:
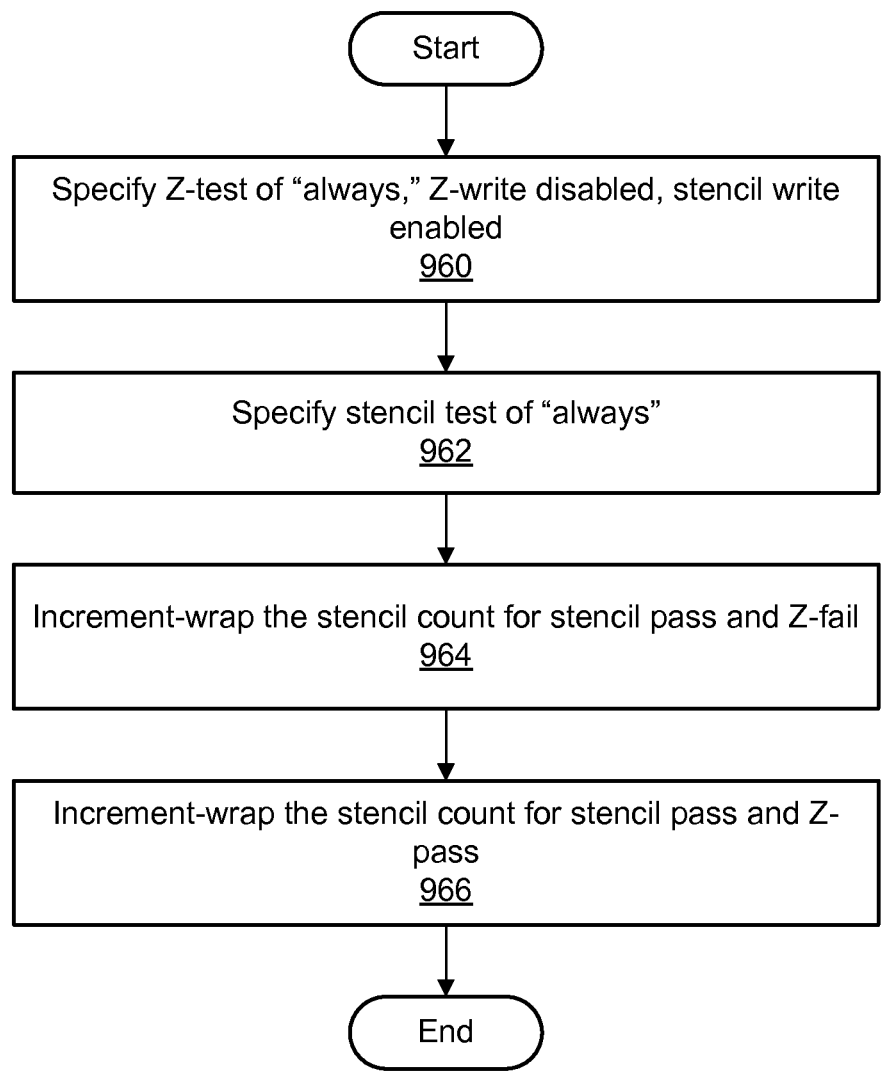
FIG. 6 is a flow diagram illustrating a method for counting the number of surfaces rendered and adding the number to the existing stencil count according to one embodiment.

FIGS. 5A, 5B and 6 are flow diagrams illustrating further aspects of the operation shown in block 920 according to one embodiment. In one embodiment, blocks 940 through 948 of FIG. 5A may be used to perform the operation shown in block 920. In one embodiment, blocks 940 through 948 of FIG. 5B and blocks 960 through 966 of FIG. 6 may be used to perform the operation shown in block 920.

FIG. 5A illustrates a method for counting the number of surfaces rendered after the nearest surface in Stenciled Layer Peeling and storing the result as a positive number in the stencil according to one embodiment. As shown in block 940, the Z-buffer may be cleared to Z-far. As shown in block 942, a Z-test of "less" may be specified, with Z-write enabled and stencil write enabled. As shown in block 944, a stencil test of "always" may be specified so that the stencil test always passes. Because "always" is used as the stencil test, the possibility of a stencil fail result is not relevant. As shown in block 946, it may be specified that if stencil pass and Z-fail results are encountered, then the stencil count may be incremented. As shown in block 948, it may be specified that if stencil pass and Z-pass results are encountered, then the stencil count may be set to zero.

The semi-transparent geometry may then be rendered using the parameters established in blocks 940 through 948. Each time a nearer surface is rendered, the stencil count may be set to zero. However, the last surface for which this may happen is the nearest surface. Afterwards, the stencil count may be incremented for all subsequent surfaces in the pass. The resulting stencil count may store the number of surfaces rendered after the nearest surface.

FIG. 5B illustrates a method for counting the number of surfaces rendered after the nearest surface in Stenciled Layer Peeling and storing the result as a negative number in the stencil according to one embodiment. As shown in block 940, the Z-buffer may be cleared to Z-far. As shown in block 942, a Z-test of "less" may be specified, with Z-write enabled and stencil write enabled. As shown in block 944, a stencil test of "always" may be specified so that the stencil test always passes. Because "always" is used as the stencil test, the possibility of a stencil fail result is not relevant. As shown in block 947, it may be specified that if stencil pass and Z-fail results are encountered, then the stencil count may be decrement-wrapped. As shown in block 948, it may be specified that if stencil pass and Z-pass results are encountered, then the stencil count may be set to zero. The semi-transparent geometry may then be rendered using the parameters established in blocks 940 through 948 as shown in FIG. 5B.

FIG. 6 illustrates a method for counting the number of surfaces rendered to a sample and adding the number to the existing stencil count according to one embodiment. In one embodiment, the operations shown in blocks 940 through 948 of FIG. 5B may be performed prior to performing the operations shown in FIG. 6. As a result of the operations shown in FIG. 5B, a negative number may be stored in the stencil count whose magnitude is the number of surfaces rendered after the nearest semi-transparent surface. The operations shown in FIG. 6 may then add the total number of fragments rendered to that sub-pixel. In one embodiment, the result is equal to the number of surfaces rendered before the nearest semi-transparent surface plus one.

As shown in block 960, a Z-test of "always" may be specified, with Z-write disabled and stencil write enabled. As shown in block 962, a stencil test of "always" may be specified so that the stencil test always passes. Because "always" is used as the stencil test, the possibility of a stencil fail result is not relevant. As shown in block 964, it may be specified that if stencil pass and Z-fail results are encountered, then the stencil count may be increment-wrapped. As shown in block 966, it may be specified that if stencil pass and Z-pass results are encountered, then the stencil count may be increment-wrapped. The semi-transparent geometry may then be rendered using the parameters established in blocks 960 through 966.

Figure 7:
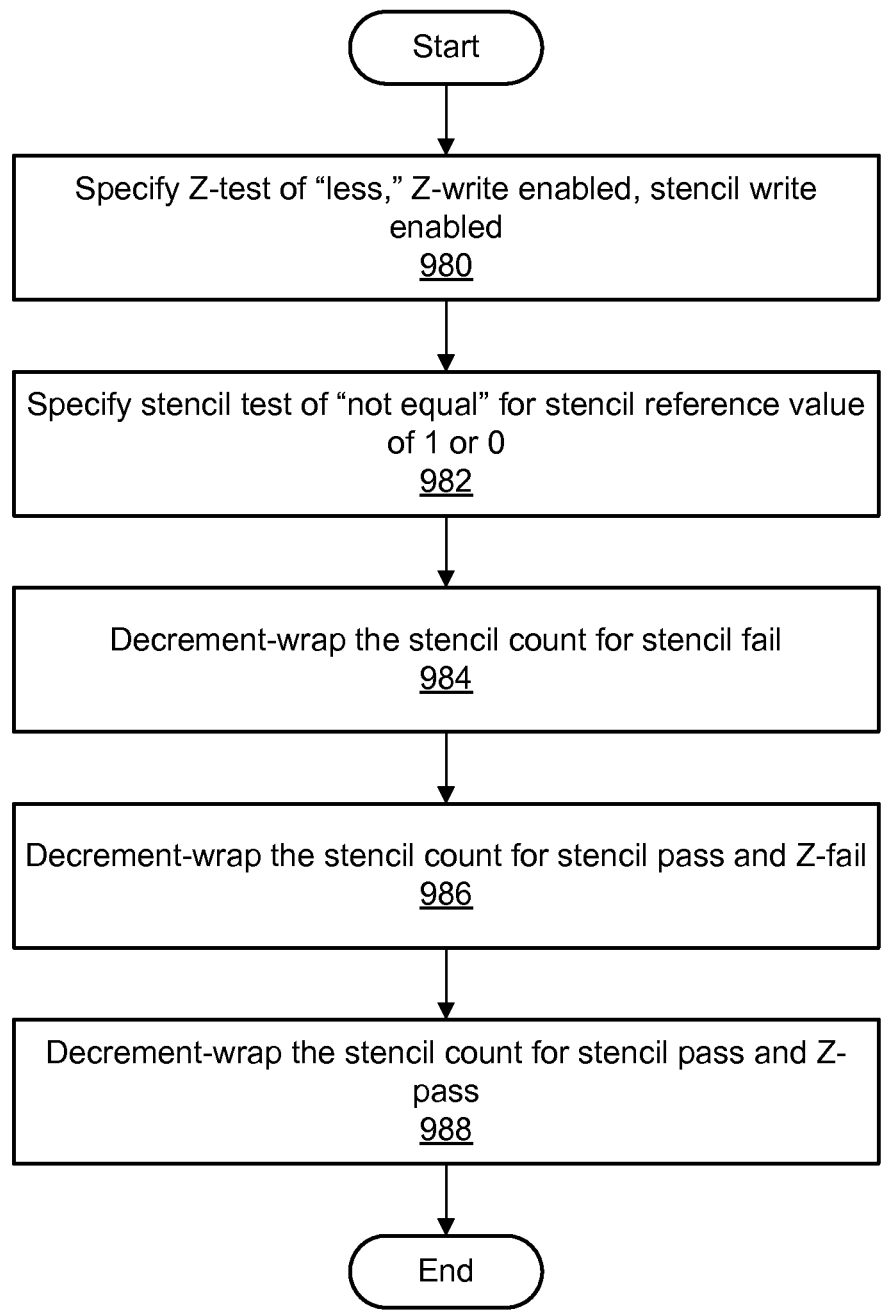
FIG. 7 is a flow diagram illustrating the rendering of a second nearest semi-transparent surface to a Z-buffer in Stenciled Layer Peeling according to one embodiment.

FIG. 7 is a flow diagram illustrating further aspects of the operation shown in block 926 according to one embodiment. As shown in block 980, a Z-test of "less" may be specified, with Z-write enabled and stencil write enabled. As shown in block 982, a stencil test of "not equal" may be specified for a stencil reference value of 1 (if the technique shown in FIGS. 5B and 6 has been used) or a stencil reference value of 0 (if the technique shown in FIG. 5A has been used, i.e., if rendering for FIG. 7 is performed in reverse order). As shown in block 984, it may be specified that if a stencil fail result is encountered, then the stencil count may be decrement-wrapped. As shown in block 986, it may be specified that if stencil pass and Z-fail results are encountered, then the stencil count may be decrement-wrapped. As shown in block 990, it may be specified that if stencil pass and Z-pass results are encountered, then the stencil count may be decrement-wrapped. In one embodiment, these operations may result in the rendering of all of the semi-transparent fragments except for the nearest one; additionally, the depth of the second nearest surface may be left in the frame buffer at the end of the pass if it is closer than the nearest opaque surface. The semi-transparent geometry may then be rendered using the parameters established in blocks 980 through 990.

In one embodiment, operations such as the following exemplary operations may be used to implement Stenciled Layer Peeling on a typical GPU. For example, the operation drawToZNearestZAndCountZPassesToStencil( ) may be used to find the depth of the nearest surface and the number of Z-passes to reach the nearest surface. The operation drawOpaqueToZAndColorKeepingStencil( ) may then be used to render the color and depth of the opaque geometry while keeping the stencil buffer intact. Additionally, the operation drawToZNearestZExceptStenciledZ( ) may be used to find the depth of the second-nearest surface and render it to the depth buffer. The operation drawTransparentColorAndAlphaOverUsingZEqual( ) may be used to composite the second nearest surface into the frame buffer. Furthermore, the operation drawTransparentColorAndAlphaOverUsingZLess( ) may be used to composite the nearest surface into the frame buffer.

In one embodiment, the semi-transparent surfaces may be unsorted in depth and processed in draw order. In another embodiment, the semi-transparent surfaces may be sorted in depth prior to performing the Stenciled Layer Peeling techniques. The Stenciled Layer Peeling techniques may then be performed for a plurality of iterations, each iteration rendering a pair of semi-transparent surfaces, from back to front in the depth order. If the number of semi-transparent surfaces is odd, then the final (e.g., nearest) semi-transparent surface may be rendered after the Stenciled Layer Peeling techniques have been used to render the other semi-transparent surface.

In one embodiment, Stenciled Layer Peeling may be constrained to rendering only the two closest semi-transparent surfaces along with the nearest opaque surface. Conventional layer peeling techniques may also be limited to a fixed number of semi-transparent surfaces for reasons of efficiency. Thus, for Stenciled Layer Peeling as well as conventional layer peeling, surfaces below the nearest N surfaces may be omitted except for the nearest opaque surface.

In conjunction with Stenciled Layer Peeling techniques or other layer peeling techniques, a further enhancement may be used for surfaces for which a texture map or procedural shader is used to compute an opacity value (i.e., an alpha value). In this further enhancement, such variable opacity surfaces may be included in the transparent and opaque rendering passes of layer peeling algorithms; however, the opacity of a fragment may be used to determine whether it is omitted from that pass. The fragment discard feature of a typical GPU may be used to implement this fragment culling technique.

In one embodiment, when rendering a variable opacity surface during a transparent pass, a fragment may be discarded if the opacity of the fragment is less than a lower threshold or greater than an upper threshold. In one embodiment, the lower threshold is any suitable quantity greater than or equal to zero, the upper threshold is any suitable quantity less than or equal to one, and the lower threshold is less than or equal to the upper threshold. In one embodiment, threshold values of 0.0 and 1.0 may allow for precise rendering of alpha-mapped surfaces. However, for images stored in lossy compressed formats (e.g., JPEG), a lower threshold slightly greater than 0.0 (e.g., 0.1) and an upper threshold slightly less than 1.0 may remove otherwise visible artifacts.

If the opacity is less than the lower threshold, the fragment may be omitted because it is nearly fully transparent. On the other hand, if the opacity is greater than the upper threshold, the fragment may be omitted because it is expected to be properly handled by the opaque geometry pass. In a similar manner, when the same geometry is also rendered as part of the opaque geometry pass, all fragments having an opacity of less than the upper threshold may be discarded.

The fragment culling enhancement to layer peeling techniques may be used, for example, for foliage or anti-aliased text in which the only artifacts visible will be along the soft edges where three or more such surfaces are on top of each other. Where an alpha map is being used to approximate anti-aliased opaque geometry, there may be significant areas where opacity values are zero or one, and the fragment culling enhancement may thus prevent unnecessary processing of such areas.

In various embodiments, the elements shown in FIGS. 3, 4, 5, 6 and 7 may be performed in a different order than the illustrated order. In FIGS. 3, 4, 5, 6 and 7, any of the operations described in the elements may be performed programmatically (i.e., by a computer according to a computer program). In FIGS. 3, 4, 5, 6 and 7, any of the operations described in the elements may be performed automatically (i.e., without user intervention).

FIG. 8 is a block diagram illustrating constituent elements of a computer system 1000 that is configured to implement embodiments of the system and method for rendering artwork including semi-transparent surfaces. The computer system 1000 may include one or more processors 1010 implemented using any desired architecture or chip set, such as the SPARC™ architecture, an x86-compatible architecture from Intel Corporation or Advanced Micro Devices, or an other architecture or chipset capable of processing data. In different embodiments, the computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device. Any desired operating system(s) may be run on the computer system 1000, such as various versions of Unix, Linux, Windows™ from Microsoft Corporation, MacOS™ from Apple Corporation, or any other operating system that enables the operation of software on a hardware platform. The processor(s) 1010 may be coupled to one or more of the other illustrated components, such as a memory 1020, by at least one communications bus.

In one embodiment, a GPU 100 may be included in a specialized graphics card or other graphics component that is coupled to the processor(s) 1010. Additionally, the computer system 1000 may include one or more displays 1052. In one embodiment, the display(s) 1052 may be coupled to the GPU 100 for display of data provided by the GPU 100.

Program instructions 120 that may be executable by the processor(s) 1010 to implement aspects of the techniques described herein (e.g., for rendering artwork including semi-transparent surfaces) may be partly or fully resident within the memory 1020 at the computer system 1000 at any point in time. The program instructions 120 may include, for example, artwork rendering instructions 120A and/or 120B. As described above, the instructions 120 may also be provided to the GPU 100 for execution by the GPU 100. The memory 1020 may be implemented using any appropriate medium such as any of various types of ROM or RAM (e.g., DRAM, SDRAM, RDRAM, SRAM, etc.), or combinations thereof. The program instructions 120 may also be stored on a storage device 1060 accessible from the processor(s) 1010. Any of a variety of storage devices 1060 may be used to store the program instructions 1040 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1060 may be coupled to the processor(s) 1010 through one or more storage or I/O interfaces. In some embodiments, the program instructions 1040 may be provided to the computer system 1000 via any suitable computer-readable storage medium including the memory 1020 and storage devices 1060 described above.

The computer system 1000 may also include one or more additional I/O interfaces, such as interfaces for one or more user input devices 1050. In addition, the computer system 1000 may include one or more network interfaces 1054 providing access to a network. It should be noted that one or more components of the computer system 1000 may be located remotely and accessed via the network. The program instructions 120 may be implemented in various embodiments using any desired programming language, scripting language, or combination of programming languages and/or scripting languages, e.g., C, C++, C#, Java™, Perl, etc. It will be apparent to those having ordinary skill in the art that computer system 1000 can also include numerous elements not shown in FIG. 8, as illustrated by the ellipsis shown.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for rendering an artwork comprising a plurality of surfaces that include a plurality of semi-transparent surfaces unsorted in depth, the method comprising:
   determining an identifier of a nearest semi-transparent surface of the plurality of semi-transparent surfaces;
   storing the identifier in a stencil count of a stencil buffer;

determining a depth of a second nearest semi-transparent surface of the plurality of semi-transparent surfaces, the depth of the second nearest semi-transparent surface determined using a stencil test based on the stencil count to bypass the nearest semi-transparent surface;

rendering the second nearest semi-transparent surface to an image buffer; and rendering the nearest semi-transparent surface to the image buffer after said rendering the second nearest semi-transparent surface.

2. The method as recited in claim 1, wherein the identifier comprises a number of semi-transparent surfaces encountered after encountering the nearest semi-transparent surface in a draw order of the semi-transparent surfaces.

3. The method as recited in claim 1, wherein the identifier comprises a number of semi-transparent surfaces encountered before encountering the nearest semi-transparent surface in a draw order of the semi-transparent surfaces.

4. The method as recited in claim 1, wherein:

said rendering the second nearest semi-transparent surface to the image buffer comprises using a z-equals test based on the depth of the second nearest semi-transparent surface; and said rendering the nearest semi-transparent surface to the image buffer comprises using a z-less test based on the depth of the second nearest semi-transparent surface.

5. The method as recited in claim 1, wherein:

the image buffer comprises a multi-sampled image buffer;

said rendering the second nearest semi-transparent surface comprises rendering the second nearest semi-transparent surface to the multi-sampled image buffer at a multi-sampled resolution;

said rendering the nearest semi-transparent surface comprises rendering the nearest semi-transparent surface to the multi-sampled image buffer at the multi-sampled resolution; and the method further comprising:

reducing the rendered second nearest semi-transparent surface and the rendered nearest semi-transparent surface from the multi-sampled resolution to a display resolution.

6. The method as recited in claim 1, further comprising:

rendering a nearest opaque surface of the plurality of surfaces to the image buffer before said rendering the second nearest semi-transparent surface and the nearest semi-transparent surface to the image buffer.

7. The method as recited in claim 1, wherein said determining the identifier of the nearest semi-transparent surface of the plurality of semi-transparent surfaces comprises:

encountering each of the surfaces in the plurality of surfaces; and discarding one of the surfaces having an opacity less than a lower threshold or greater than an upper threshold.

8. A computer-readable memory storage device, comprising stored program instructions for rendering an artwork comprising a plurality of surfaces that include a plurality of semi-transparent surfaces unsorted in depth, the program instructions computer-executable to implement:

determining an identifier of a nearest semi-transparent surface of the plurality of semi-transparent surfaces;

storing the identifier in a stencil count of a stencil buffer;

determining a depth of a second nearest semi-transparent surface of the plurality of semi-transparent surfaces, the depth of the second nearest semi-transparent surface determined using a stencil test based on the stencil count to bypass the nearest semi-transparent surface;

rendering the second nearest semi-transparent surface to an image buffer; and rendering the nearest semi-transparent surface to the image buffer after said rendering the second nearest semi-transparent surface.

9. The computer-readable memory storage device as recited in claim 8, wherein the identifier comprises a number of semi-transparent surfaces encountered after encountering the nearest semi-transparent surface in a draw order of the semi-transparent surfaces.

10. The computer-readable memory storage device as recited in claim 8, wherein the identifier comprises a number of semi-transparent surfaces encountered before encountering the nearest semi-transparent surface in a draw order of the semi-transparent surfaces.

11. The computer-readable memory storage device as recited in claim 8, wherein:

said rendering the second nearest semi-transparent surface to the image buffer comprises using a z-equals test based on the depth of the second nearest semi-transparent surface; and said rendering the nearest semi-transparent surface to the image buffer comprises using a z-less test based on the depth of the second nearest semi-transparent surface.

12. The computer-readable memory storage device as recited in claim 8, wherein:

the image buffer comprises a multi-sampled image buffer;

said rendering the second nearest semi-transparent surface comprises rendering the second nearest semi-transparent surface to the multi-sampled image buffer at a multi-sampled resolution;

said rendering the nearest semi-transparent surface comprises rendering the nearest semi-transparent surface to the multi-sampled image buffer at the multi-sampled resolution; and the program instructions are further computer-executable to implement:

reducing the rendered second nearest semi-transparent surface and the rendered nearest semi-transparent surface from the multi-sampled resolution to a display resolution.

13. The computer-readable memory storage device as recited in claim 8, wherein the program instructions are further computer-executable to implement:

rendering a nearest opaque surface of the plurality of surfaces to the image buffer before said rendering the second nearest semi-transparent surface and the nearest semi-transparent surface to the image buffer.

14. The computer-readable memory storage device as recited in claim 8, wherein said determining the identifier of the nearest semi-transparent surface of the plurality of semi-transparent surfaces comprises:

encountering each of the surfaces in the plurality of surfaces; and discarding one of the surfaces having an opacity less than a lower threshold or greater than an upper threshold.

15. A system, comprising:

at least one processor; and memory coupled to the at least one processor, the memory comprising an image buffer and a stencil buffer, the memory configured to store an artwork comprising a plurality of surfaces, that comprise a plurality of semi-transparent surfaces unsorted in depth, and the memory is further configured to store program instructions executable by the at least one processor to:

determine an identifier of a nearest semi-transparent surface of the plurality of semi-transparent surfaces;

store the identifier in a stencil count of the stencil buffer;
determine a depth of a second nearest semi-transparent surface of the plurality of semi-transparent surfaces, the depth of the second nearest semi-transparent surface determined using a stencil test based on the stencil count to bypass the nearest semi-transparent surface;
render the second nearest semi-transparent surface to the image buffer; and
render the nearest semi-transparent surface to the image buffer after the second nearest semi-transparent surface is rendered.

16. The system as recited in claim 15, wherein the identifier comprises a number of semi-transparent surfaces encountered after encountering the nearest semi-transparent surface in a draw order of the semi-transparent surfaces.

17. The system as recited in claim 15, wherein the identifier comprises a number of semi-transparent surfaces encountered before encountering the nearest semi-transparent surface in a draw order of the semi-transparent surfaces.

18. The system as recited in claim 15, wherein the program instructions are further executable to:
use a z-equals test based on the depth of the second nearest semi-transparent surface to render the second nearest semi-transparent surface to the image buffer; and
use a z-less test based on the depth of the second nearest semi-transparent surface to render the nearest semi-transparent surface to the image buffer.

19. The system as recited in claim 15, wherein:
the image buffer comprises a multi-sampled image buffer;
the program instructions are further executable to:
render the second nearest semi-transparent surface to the multi-sampled image buffer at a multi-sampled resolution to render the second nearest semi-transparent surface;
render the nearest semi-transparent surface to the multi-sampled image buffer at the multi-sampled resolution to render the nearest semi-transparent surface; and
reduce the rendered second nearest semi-transparent surface and the rendered nearest semi-transparent surface from the multi-sampled resolution to a display resolution.

20. The system as recited in claim 15, wherein the program instructions are further executable to:
render a nearest opaque surface of the plurality of surfaces to the image buffer before rendering the second nearest semi-transparent surface and the nearest semi-transparent surface to the image buffer.

* * * * *